Oct. 18, 1932.    P. C. BOND ET AL    1,883,507
METER CONTAINER
Filed Feb. 25, 1929    2 Sheets-Sheet 1

INVENTORS
Percy C. Bond
Alfred F. Bond
Ernest Orlando
BY
ATTORNEYS

Oct. 18, 1932.　　P. C. BOND ET AL　　1,883,507

METER CONTAINER

Filed Feb. 25, 1929　　2 Sheets-Sheet 2

INVENTORS
*Percy C. Bond*
*Alfred F. Bond*
*Ernest Orlando*

BY

ATTORNEYS

Patented Oct. 18, 1932

1,883,507

UNITED STATES PATENT OFFICE

PERCY C. BOND, ALFRED F. BOND, AND ERNEST ORLANDO, OF DETROIT, MICHIGAN, ASSIGNORS TO PERCY C. BOND, TRUSTEE FOR PERCY C. BOND, EDWIN F. RAUSS, AND ALFRED F. BOND

METER CONTAINER

Application filed February 25, 1929. Serial No. 342,634.

Our invention relates to the disposition of public utility meters, by means whereof such meters may be installed in the wall of the building to be served by the utility companies and readings of the meters so installed may be made from without the building.

Heretofore meters have been installed within the building and in order to read the records exhibited by the dials thereof the meter man must enter the building. This involves inconvenience for the occupants of the building, in the case particularly of private residences and involves inconvenience to the employee. Furthermore, the present practice imposes upon the householder, the risk of admitting persons, who, with criminal intent gain unlawful entrance by falsely representing themselves to be employees of public utility companies, which thereby subjects the occupants to the depredations of such wrong doers.

The public utility companies will benefit by our invention in reducing the time required to enter and read the meter by eliminating the time that is taken in entering the building and reaching the meter and furthermore, by making meters available for reading from without the employee is independent of the presence within the building of any one needed to admit him and accordingly the meter may be read upon the first call. All recalls will thus be avoided.

Our invention is adapted to provide a meter casing that may be built in the wall of any building wherein public utility meters may be installed and the recording dial readings thereof may be effected without having to enter the building. The effective operation of the meter is, by the instrumentalities provided herein adequately protected against disturbance by weather or climatic conditions and against interference by the occupants of the building.

With the foregoing in view this invention provides a casing to receive and hold such meters either singly or collectively, with means to prevent tampering with the intake pipes and electric current leads and means to prevent exposure to temperatures below freezing, all of which are necessary to make it effective and will be now described in detail with reference to the accompanying drawings, wherein:—

Figure 1:
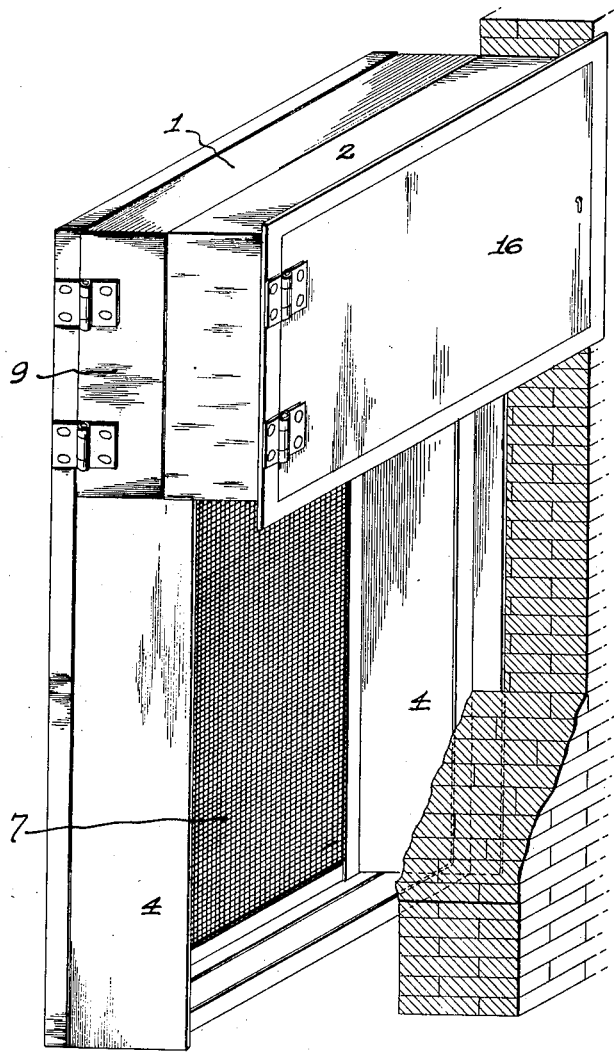
Figure 1 is a general view in isometric projection of an embodiment of our invention, part of the wall having been broken away to more fully reveal the meter receptacle casing.
Figure 2:
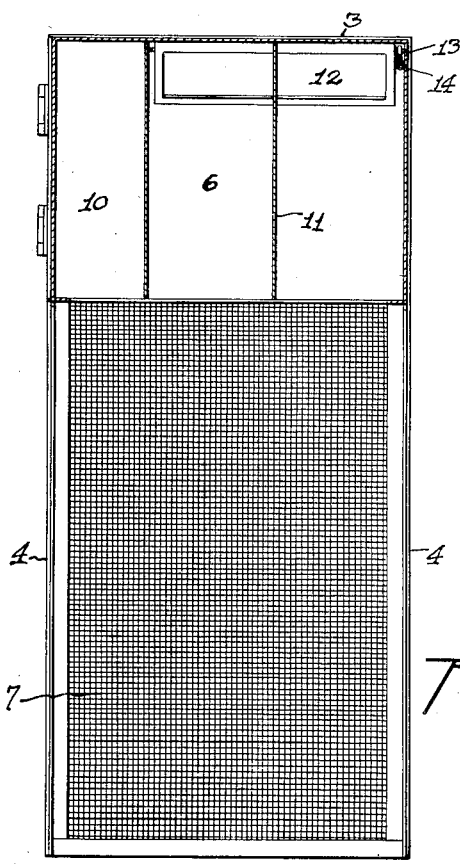
Figure 2 is a vertical section on the line 2—2 of Figure 3.

The meter receptacle is divided into two sections 1 and 2 having flanges 3 that engage with each other and are joined by any suitable means. The casing section 1 has flanges 4 on its lower portion that engage with the wall inside the building. The casing section 1 has a lower compartment 5 and an upper compartment 6. The lower compartment is open on the side adjacent the wall and on its other side is covered with a grille 7. It communicates with the upper compartment 6 and is designed to surround the intake pipes 17 leading to the meters thereby preventing any obstruction of view of the intake pipes 17 and allowing light to reach the pipes, thereby constituting an intake pipe guard.

Figure 3:
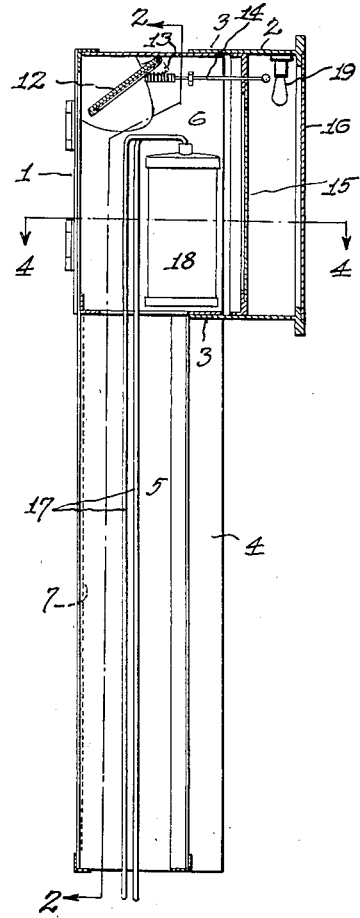
Figure 3 is another vertical section.
Figure 4:
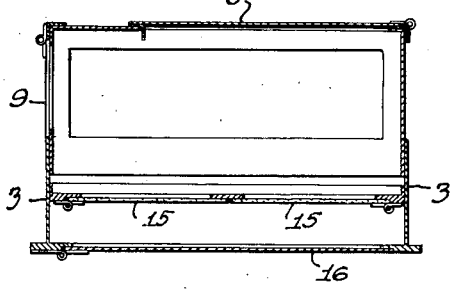
Figure 4 is a transverse section on the line 4—4 of Figure 3 omitting the meter and intake pipes.

The upper compartment 6 is designed to register with an aperture in the outer wall of the building and constitutes the meter chamber in which the meters may be installed as shown at 18, Figure 3. The upper compartment 6 has an electrically insulated chamber 10 for the installation of the electric current meter. The remaining portion may be divided by the partition 11 and therein may be installed the gas and water meters.

The meter chamber is provided with a mirror 12 pivoted on the ceiling of the chamber and having a gear segment 13 that engages with a worm on a shaft 14, at which the angle of inclination of the mirror may be adjusted at will. The mirror is placed in the meter chamber where it will reflect the intake and discharge pipes 17 from the point where they enter the intake pipe guard to where they enter the meter to a person outside the building. The mirror 12 constitutes means for inspecting the intake pipes and in the event the intake pipes have been tampered with it will be readily detected by the means provided.

The upper compartment is provided with a door 8 at the rear of the meter receptacle casing opening into the interior of the building. The upper compartment is also provided with a door 9 at the side thereof permitting communication with the electrically insulated chamber 10. This door is provided to allow inspection of the electric current meter.

The casing section 2 is designed to register with and be joined to casing section 1 through the aperture in the wall from the outside of the building. It is provided with an outside door 16 and glass doors 15. The glass doors are spaced inside the casing section 2 from the outside door 16 constituting thereby an air chamber. Intermediate the doors and fixed to a portion of the casing is an electric light 19.

It is not necessary to follow the form of casing described that surrounds the intake pipes. Any casing that constitutes a guard against obstructing the inspection of the pipes by a person outside will suffice nor is it necessary to follow the precise form or reflecting means shown. Means must be provided however to permit detection of tampering with the inlets before reaching the meter. Also because the meters will be exposed to degrees of temperature below freezing provision must be made to insulate the meter chamber against such temperatures. For this purpose we have provided the air chamber between the glass doors and the outer door but other just as effective means may be used without departing from the essence of our invention. While the casing is shown divided into two sections, this is not necessary except for the sake of convenience and the casing may quite obviously be constructed in one section.

What we claim is:—

1. The combination with a wall of a building having an opening therein and meters positioned in the said building and adjacent to the said opening for inspection and reading from without the building and connected to intake conduits within the building, of a casing surrounding said opening and having closures to the interior and to the exterior of the building spaced from each other.

2. The combination with the wall of a building having an opening therein and a casing positioned in said opening and having a movable wall to provide openable and closable communication with the exterior of the building and an inner wall, spaced from the movable wall to provide a closed air chamber between the exterior and the interior of the building, of meters adjacent said casing to face the exterior of the building and positioned within the building.

3. In combination, the wall of a building open at a point to permit inspection through said wall, meters adjacent said wall at said point, facing the exterior of the building and positioned within the building, and a casing within said wall at said point and having spaced closures, one of which is transparent and the other of which is movable to enclose said opening and to permit inspection of said meters from without the building and to provide heat insulating means between the exterior of the building and the meters within the building.

4. In combination, the wall of a building open at a point to permit inspection through said wall, meters within the building and adjacent said wall at said point and facing the exterior of the building, and a casing within said wall at said point and having an outer movable closure and an inner transparent closure to enclose said opening, to permit inspection of said meters from without the building, and to provide an air chamber between the meters and the exterior of the building.

5. A meter reading device comprising a casing adapted to enclose from end to end an opening through the wall of a building, closures at each end of said casing to provide heat insulating air chamber for the area of the opening in the wall, the closure for one end being movable and the closure for the other end thereof being transparent to permit inspection through the opening in the wall.

6. A meter reading device comprising a casing adapted to enclose from end to end an opening through the wall of a building and having spaced closures one of which is movable to open and close the casing and the other of which is transparent to permit inspection through the casing when open and both of which with the casing, constitute an enclosed air chamber for the length of the opening to provide heat insulating means for the area of the said opening.

7. A meter reading device, comprising a casing adapted to fit an opening through a wall of a building, a movable closure for the end of the casing to be exposed to the exterior of the building and a transparent closure for the end of the casing to be exposed to the interior of the building to permit inspection through the said opening when the first mentioned of said closures is moved and to constitute a heat insulating means from end to end of the opening through the wall between the exterior and the interior of the building when closed, whereby meters may be placed within the building adjacent said opening and facing the exterior of the building.

8. A meter reading device comprising a casing to fit from end to end an opening through the wall of a building, means associated with said casing comprising a movable closure and a transparent closure spaced from each other to enclose the said casing in said wall and to permit inspection from the exterior of the building through said opening, another casing adapted to hold meters and associated with the first mentioned casing and having an opening towards the said first casing for inspection of the meters in said other casing.

9. A meter reading device comprising a casing to fit from end to end an opening through the wall of a building, spaced closures for said casing to close the ends thereof one of which is movable to open and close said casing and the other of which is transparent, a meter enclosing casing associated with said first casing, said meter enclosing casing having an opening towards and positioned to be in the line of vision through said first casing, a grid in said meter enclosing casing to permit access of heat and light into the said last casing whereby inspection through the said opening in the wall of meters enclosed in the said last casing may be made and heat insulating means is provided between the exterior of the building and the meter enclosing casing for the area and length of said opening in the wall.

10. A meter reading device comprising a casing to fit an opening in a wall of a building, an outer movable closure and an inner transparent closure for said casing, an elongated downward section communicating with said casing to enclose meters within the building and their connections, a reflecting surface pivoted in said section and positioned to reflect towards the exterior of the building through said casing, a grid in said elongated section whereby inspection through said opening in the wall of meters and their connections enclosed in said section may be made and heat insulating means is provided between the exterior of the building and said meter enclosing section for the area of said opening in the wall.

11. A meter reading device comprising a casing adapted to enclose, from end to end, an opening through the wall of a building, closures at each end of said casing to provide a heat insulating air chamber for the area of the opening in the wall, the closure for one end being protective and movable and the closure for the other end being transparent to permit inspection through the opening in the wall.

12. A meter reading device comprising a casing adapted to enclose, from end to end, an opening through the wall of a building, closures at each end of said casing to provide a heat insulating air chamber for the area of the opening in the wall, the closure for one end being protective and movable to permit inspection through the opening in the wall and the closure for the other end being transparent to permit inspection through the opening in the wall.

In testimony whereof we affix our signatures.

PERCY C. BOND.
ERNEST ORLANDO.
ALFRED F. BOND.